(12) United States Patent
Hine et al.

(10) Patent No.: US 8,368,781 B2
(45) Date of Patent: Feb. 5, 2013

(54) IMAGING OBJECT

(75) Inventors: Yoichi Hine, Tokyo (JP); Shin Endo, Tokyo (JP)

(73) Assignee: King Jim Co., Ltd., Tokyo (JP)

( * ) Notice: Subject to any disclaimer, the term of this patent is extended or adjusted under 35 U.S.C. 154(b) by 0 days.

(21) Appl. No.: 13/499,164

(22) PCT Filed: Jul. 13, 2011

(86) PCT No.: PCT/JP2011/065956
§ 371 (c)(1),
(2), (4) Date: Apr. 26, 2012

(87) PCT Pub. No.: WO2012/039185
PCT Pub. Date: Mar. 29, 2012

(65) Prior Publication Data
US 2012/0218446 A1    Aug. 30, 2012

(30) Foreign Application Priority Data

Sep. 21, 2010 (JP) ................................. 2010-211265
Feb. 4, 2011 (JP) ................................. 2011-022818

(51) Int. Cl.
*H04N 5/217* (2011.01)
*G06K 9/18* (2006.01)
(52) U.S. Cl. ........................................ 348/241; 382/184
(58) Field of Classification Search .................. 382/183, 382/184, 287
See application file for complete search history.

(56) References Cited

U.S. PATENT DOCUMENTS

| | | | |
|---|---|---|---|
| 5,008,947 A * | 4/1991 | Yamada | 382/132 |
| 5,726,435 A * | 3/1998 | Hara et al. | 235/494 |
| 6,816,630 B1 * | 11/2004 | Werth et al. | 382/287 |
| 7,280,706 B2 * | 10/2007 | Wu et al. | 382/275 |
| 7,317,557 B2 | 1/2008 | Pollard et al. | |
| 7,813,550 B2 * | 10/2010 | Komada | 382/177 |
| 2003/0053714 A1 * | 3/2003 | Esaki et al. | 382/287 |
| 2004/0193697 A1 | 9/2004 | Grosvenor et al. | |
| 2005/0213174 A1 | 9/2005 | Maki et al. | |

(Continued)

FOREIGN PATENT DOCUMENTS

| | | |
|---|---|---|
| JP | 07007616 | 1/1995 |
| JP | 10-231038 | 9/1998 |

(Continued)

OTHER PUBLICATIONS

U.S. Appl. No. 13/448,664, filed Apr. 17, 2012; In re: Hine et al. entitled *Image Processing System and Imaging Object Used for Same*.
International Search Report from International Patent Application No. PCT/JP2011/065956, mailed Aug. 16, 2011.
Notice of Reason for Rejection from Japanese Patent Application No. 2010-211265, mailed Mar. 1, 2011.

(Continued)

*Primary Examiner* — Albert Cutler
(74) *Attorney, Agent, or Firm* — Alston & Bird LLP

(57) ABSTRACT

The present invention provides an imaging technology having high reproducibility of a document and making image correction possible, without being influenced by a way of placing the document or a position of a camera, and irrespective of paper color and despite of damage of a corner portion. By printing positioning symbols on document paper in advance when the document is photographed by a digital camera or a portable phone with a camera, such as a smart phone, and by processing the image based on these positioning symbols, image processing having high reproducibility of the document and making image correction (keystone correction) possible can be implemented irrespective of paper color and despite of damage of a corner portion.

9 Claims, 10 Drawing Sheets

U.S. PATENT DOCUMENTS

| | | | |
|---|---|---|---|
| 2006/0039595 A1* | 2/2006 | Adel et al. | 382/144 |
| 2006/0170968 A1 | 8/2006 | Maki et al. | |
| 2006/0187477 A1 | 8/2006 | Maki et al. | |
| 2007/0051813 A1* | 3/2007 | Kiuchi et al. | 235/462.1 |
| 2012/0069383 A1 | 3/2012 | Hine et al. | |

FOREIGN PATENT DOCUMENTS

| | | |
|---|---|---|
| JP | 2003-015218 | 1/2003 |
| JP | 2004-164532 | 6/2004 |
| JP | 2004295423 | 10/2004 |
| JP | 2005-514704 | 5/2005 |
| JP | 2006-074211 | 3/2006 |
| JP | 2006178692 | 7/2006 |
| JP | 2006-277445 | 10/2006 |
| JP | 2006-303920 | 11/2006 |
| JP | 2006-318099 | 11/2006 |
| JP | 2007194794 | 8/2007 |
| JP | 2008-048367 | 2/2008 |
| JP | 2008-135916 | 6/2008 |
| JP | 2009-130911 A | 6/2009 |
| JP | 2010093466 | 4/2010 |
| JP | 2010-130181 A | 6/2010 |
| WO | WO 2006/013956 A1 | 2/2006 |

OTHER PUBLICATIONS

Notice of Reason for Rejection from Japanese Patent Application No. 2010-211265, mailed May 24, 2011.

Ono, Tsukasa and Egawa, Yuki; "A Study of Digital Watermark for Printed Image"; Journal of Information Processing Society of Japan; Mar. 15, 2004; vol. 45, No. 3; pp. 880-890.

Notice of Reason for Rejection for Japanese Patent Application No. 2012-022057, mailed Mar. 13, 2012.

Notice of Reasons for Rejection for Japanese Patent Application No. 2012-066786, mailing date Jul. 17, 2012.

Notice of Reasons for Rejection for Japanese Patent Application No. 2012-100422, mailing date Jul. 17, 2012.

Notice of Reasons for Rejection for Japanese Patent Application No. 2012-100423, mailing date Jul. 17, 2012.

Notice of Reasons for Rejection for Japanese Patent Application No. 2012-114022, mailing date Jul. 17, 2012.

Notice of Reasons for Rejection for Japanese Patent Application No. 2012-114023, mailing date Jul. 17, 2012.

Notice of Reason for Rejection for Japanese Patent Application No. 2012-022057, mailing date Jul. 17, 2012.

* cited by examiner

IMAGING OBJECT

FIELD

The present invention relates to a technology effective for use as a technology for imaging a document using a compact digital camera and a camera function of a portable telephone.

BACKGROUND

Compact digital cameras and digital cameras installed in portable telephones and smartphones can now photograph high resolution images that exceed several million pixels, and have begun to be frequently used not only for photographing landscapes and portraits but also for photographing paper documents, memorandum and business cards.

In the case of an iPhone® from Apple Inc. (registered trademark is used based on Aiphone Co. Ltd. licensing), several types of applications called "scanner apps" are known, where a surface image of paper media photographed by an integrated camera is read, edges of the paper media are recognized by the change of continuous pixels, and edges which are in a trapezoidal state because of being photographed diagonally are corrected to be square (keystone correction), so that the image is finished as if the paper media were read by a contact type document scanner.

This technology for correcting an image of a document photographed by a camera is disclosed in Patent document 1. The technology disclosed in Patent document 1 is, as claim 7 and paragraph [0047] state, is that red lines RL are created as markers along both sides of a keyboard of a personal computer (main unit PCB), and keystone correction is performed using a tilt angle of the red line with respect to the side edges of the screen of the captured image as a correction parameter.
[Patent document 1] Japanese Patent Application Laid-Open No. 2010-130181

SUMMARY

According to Patent document 1, the keystone correction is performed based on the red line RL markers created on both sides of the personal computer (main unit PCB), which are photographed in the diagonal direction, therefore the keystone correction can be automated, which is an advantage, but a problem is that accurate keystone correction cannot be performed unless the document is placed in front of the personal computer (main unit (PCB), and disposed at an accurate position with respect to the personal computer (main unit PCB). In other words, it is highly possible that if the document (DCM) is disposed in a diagonal direction, even slightly, and photographed, then the document (DCM), reproduced as an image with performing the keystone correction on this tilted image, would appear deformed and unnatural.

Even if the above mentioned prior art, where the edge portion of the document is recognized and the keystone correction is performed, is also used, complicated correction calculation must be performed, and if a document is placed on a desk of which color is a similar shade as the paper thereof, or if a corner is damaged or curled up by staples, then the rate of recognizing the edge portion drops, and in many cases the document cannot be reproduced accurately.

With the foregoing in view, it is an object of the present invention to provide an imaging technology having high reproducibility of a document, without being influenced by a way of placing the document or a position of the camera, making image correction possible even if the paper color is similar to the table or a corner portion is damaged.

To Solve the Above Problems, the Following Means are Used for the Present Invention To be more precise, an image processing system according to the present invention is an image processing system comprising: an imaging object having positioning symbols disposed in at least two predetermined locations and created as symbol codes constituted by multi-valued graphics; imaging unit which images the imaging object; image acquisition unit which detects the positioning symbols from the original image data imaged by the imaging unit, recognizing a predetermined area calculated based on the positioning symbols as a first range, extracting only image data existing in the first range to acquire this image data as extracted image data; and image data storage unit which stores the extracted image data acquired by the image acquisition unit.

According to the present invention, positioning symbols (symbol codes) are disposed on such an imaging object as a document or memorandum directly, so that a document image of which image correction is possible and reproducibility is high is implemented, without being influenced by a way of placing the document or a position of the camera, even if paper color is similar to the table or a corner portion is damaged. A symbol code constituted by a multi-valued graphic refers to a symbol code having an emerging portion and a non-emerging portion. If the positioning symbol is at two or more locations, the shape can be recognized, and if the positioning symbol is at three locations, coordinates of the image can be determined. It is preferable to dispose vertex detection cells as a countermeasure for distortions during imaging. If the positioning symbols is at four locations, the shape is known even if the image is distorted during imaging, but the directions cannot be known, hence it is preferable to dispose an orientation symbol.

In the image processing system according to the present invention, it is preferable that the imaging object has an orientation symbol at a predetermined position of the first range for recognizing s direction of the first range, and a second range which is disposed within the first range or disposed as a separate area from the first range, the image acquisition unit or the image storage unit stores character information for collation in advance, and the image acquisition unit recognizes the direction of the first range based on the orientation symbol, detects the second range based on the recognized direction information, collates an image drawn in the second range with the character information, and stores the characters as information related to the image data read from the first range if it is recognized that this image is formed of characters.

According to the present invention, characters written in the second range can be recognized as character information and stored as the related information for the image data read from the first range, hence this character information can be used as an index of the image data, and retrievability of image data can be improved. A predetermined position in the first range refers to the top portion of the first range or one of the positioning symbols. The related information refers to a date, for example.

In the present invention, the character information for collation can be at least either alphabetic characters or numeric characters. By limiting the recognition of characters written in the second range to alphanumeric characters, the recognition rate can be improved and processing speed can be increased.

In the image processing system according to the present invention, it is preferable that the imaging unit reads the imaging object and transfers the captured image to the image acquisition unit if the positioning symbol is detected in at least three locations in the read image. Since the imaging unit detects the positioning symbol in at least three locations, coordinates of the image can be determined, and since the captured image data is transferred to the image processing unit, an automatic shutter can be implemented. As a result, image data can be acquired at an optimum timing without unnecessary operations by the user.

In the image processing system according to the present invention, it is preferable that the first range on the imaging object has a rectangular shape, and the positioning symbols are disposed in four vertexes of the rectangle, respectively, and the image acquisition unit reads a reference distance between the positioning symbols which is stored in advance, collates whether the distance between the positioning symbols in the captured image matches with the reference distance between the positioning symbols which is stored in advance, and corrects the captured image such that the distance between the positioning symbols in the captured image matches with the reference distance between the positioning symbols if the collated result is a mismatch.

According to the present invention, the positioning symbols are disposed on such an imaging object as a document or memorandum directly, and the image correction (keystone correction) processing is performed based on these positioning symbols. Therefore the image data acquisition range can be recognized with certainty without being influenced by the way of placing the imaging object (direction, position, location thereof), compared with the case of recognizing the edges of a paper.

In the image processing system according to the present invention, it is preferable that the surface of the imaging object is subjected to printing processing so that, when the imaging object is electronically copied, a prohibition symbol emerges at a predetermined location having a shape different from those at other locations, and when recognizing the prohibition symbol in a captured image, the imaging unit which has imaged the imaging object does not execute the processing to transfer this captured image to the image acquisition unit.

According to the present invention, image acquisition unit does not perform image processing even if an attempt is made to image an electronically copied imaging object, hence illegal electronic copying can be prevented.

The present invention can also be specified as an imaging object used for the image processing system according to the present invention. In other words, the present invention is an imaging object of the image processing system, and has positioning symbols disposed at least in two predetermined locations, and created as symbol codes constituted by multi-valued graphics.

According to the imaging object of the present invention, a positioning symbol having a special shape is set in at least two locations (e.g. upper left and lower right), so as to clearly distinguish from such graphics as handwritten characters drawn in the first range, and to define the range thereof. For the positioning symbol, positioning symbols the same as those used for QR code (trademark registration No. 4075066) may be used.

In the imaging object according to the present invention, it is preferable that the symbol code constituted by the multi-valued graphic has an emerging portion and a non-emerging portion, the non-emerging portion has a background portion and a latent image portion having different patterns which cannot be visualized in the captured image obtained by the imaging unit, and if the imaging object is electronically copied and the copy is printed, the copy is reproduced in a state where the background portion and the latent image portion emerge and are visualized.

According to the present invention, the background portion and the latent image portion which are not visualized by the imaging unit but visibly emerge by electronic copying (copying by a copy machine) are disposed in a graphic of a positioning symbol, hence illegal use of a copied imaging object can be prevented. In other words, if the imaging object copied by an electronic copy (copying by a copy machine) is imaged, the background portion and the latent image portion of the positioning symbol emerges, whereby the imaging unit can recognize the graphic of the positioning symbol as a symbol having a different shape. As a result, the imaging unit cannot specify the positioning symbol and cannot transfer the captured image data to the image acquisition unit.

In the present invention, it is preferable that the imaging object has a background portion and a latent image portion having different patterns which are not visualized in the captured image obtained from the imaging unit, in a predetermined area excluding an area where the positioning symbols are formed, and if this reading object is electronically copied and this copy is printed, the prohibition symbol where the background portion and the latent image portion emerge is visualized in the reproduction. By setting, in the predetermined area, the background portion and the latent image portion which are not visualized by the imaging unit, but visibly emerge by electronic copying (copying by copy machine), illegal use of a copied imaging object can be prevented. In other words, if the imaging unit detects the background portion and the latent image portion which visibly emerges, that is, a prohibition symbol, the captured image data is not transferred to the image acquisition unit, whereby illegal use can be prevented.

The present invention may be specified as an image processing system, comprising: a transparent sheet on which positioning symbols created as symbol codes constituted by multi-valued graphics are disposed in at least two predetermined locations, and which is placed on paper serving as an imaging object; imaging unit which images the imaging object; image acquisition unit which detects the positioning symbols from original image data on the surface of the paper imaged by the imaging unit via the transparent sheet, recognizing a predetermined area calculated based on the positioning symbols as a first range, and extracting only image data existing in the first range to acquire this image data as extracted image data; and image data storage unit which stores the extracted image data acquired by the image acquisition unit.

The present invention may also be specified as an image processing system, comprising: two or more seal pieces which are pasted onto paper serving as an imaging object, and each of which is formed of a positioning symbol created as a symbol code constituted by a multi-valued graphic; imaging unit which images the imaging object; imaging acquisition unit which detects the positioning symbols of the seal pieces from original image data on the surface of the paper imaged by the imaging unit, recognizing a predetermined area calculated based on the positioning symbols as a first range, and extracting only image data existing in the first range to acquire this image data as extracted image data; and image data storage unit which stores the extracted image data acquired by the image acquisition unit. By disposing the positioning symbol on the transparent seal or creating the positioning symbol as the seal piece, an image can be corrected even if such an imaging object as a document and memorandum has no positioning symbols.

The present invention can also be specified as an image processing method. In other words, the present invention is an image processing method used for an image processing system, which, using imaging unit, images the surface of an imaging object having positioning symbols disposed in at least two predetermined locations and created as symbol codes constituted by multi-valued graphics, processes original image data thereof by image acquisition unit and registers the processed data in image data storage unit, the image processing method comprising the steps of: the imaging unit imaging the imaging object so that at least the positioning symbols in the at least two predetermined locations are included; the image acquisition unit detecting the positioning symbols from the imaged original image data, and recognizing a predetermined area calculated based on the positioning symbols as a first range; extracting only image data existing in the first range to acquire this image data as extracted image data; and storing the extracted image data in the image data storage unit.

The present invention can also be specified as an image processing program. In other words, the present invention is an image processing program executable by an image processing system, which, using imaging unit, images the surface of an imaging object having positioning symbols disposed in at least two predetermined locations and created as symbol codes constituted by multi-valued graphics, processes original image data thereof by the image acquisition unit, and registers the processed data in image data storage unit, the image processing program comprising the steps of: the imaging unit imaging the imaging object so that at least the positioning symbols in the at least two predetermined locations are included; the image acquisition unit detecting the positioning symbols from the imaged original image data, and recognizing a predetermined area calculated based on the positioning symbols as a first range; extracting only image data existing in the first range to acquire this image data as extracted image data; and storing the extracted image data in the image data storage unit.

The present invention may be specified as an imaging object which is imaged by imaging unit, and is used for an image processing system which processes the image data by image acquisition unit and stores the data in the data storage unit, the imaging object comprising: positioning symbols which are disposed in at least two predetermined locations for determining an imaging range of the imaging object, and are created as symbol codes constituted by multi-valued graphics; and a first range which is disposed in a predetermined position based on the positioning symbols so that the image acquisition unit extracts image data.

In the imaging object according to the present invention, it is preferable that an imaging object has: an orientation symbol at a predetermined location of the first range for recognizing a direction of the first range; and a second range which is disposed within the first range or disposed as a separate area from the first range, and in which characters are written, so as to recognize a direction based on the positional relationship with the orientation symbol, and collate with the character information for collation stored in the image data storage unit in advance.

The present invention can also be specified as an image processing system used via a network, comprising: an imaging object having positioning symbols disposed in at least two predetermined locations and created as symbol codes constituted by multi-valued graphics; imaging unit for imaging the imaging object; transmission unit which transmits original image data imaged by the imaging unit via a network; image acquisition unit which, in an image processing server which receives the original image data via the network, detects the positioning symbols from the original image data imaged by the imaging unit, recognizing a predetermined area calculated based on the positioning symbols as a first range, extracting only image data existing in the first range to acquire this image data as extracted image data; and image data storage unit which stores the extracted image data acquired by the image acquisition unit.

The present invention can provide an imaging technology having high reproducibility of a document, without being influenced by a way of placing the document or a position of a camera, making image correction possible even if paper color is similar to the table or a corner portion is damaged.

DESCRIPTION OF EMBODIMENTS

Embodiment 1

Figure 1:
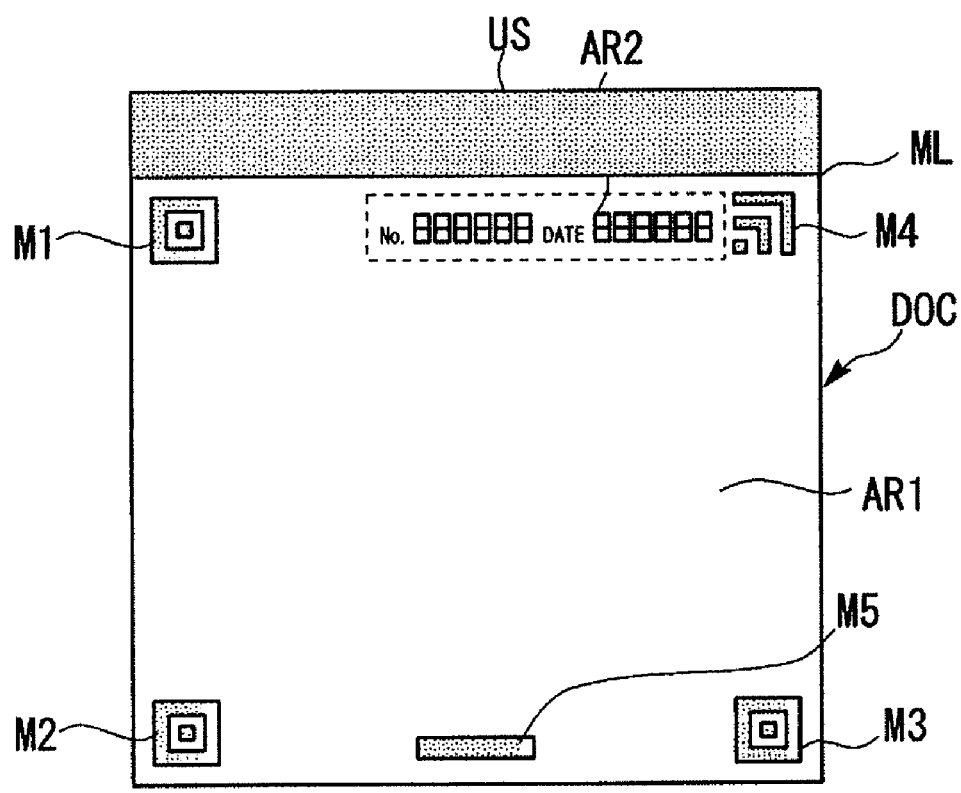
FIG. 1 is a diagram depicting a memo paper serving as an imaging object according to an embodiment, (1)

The present invention will now be described with reference to the drawings. FIG. 1 shows a configuration of the surface of a memo paper (imaging object) (DOC) according to the present embodiment. As FIG. 1 shows, this memo paper (DOC) has a binding margin (US) created at the upper portion, and a paper main portion. In the top area of the paper main portion, a perforation (ML) is created in the horizontal direction in FIG. 1 along the binding margin (US), so that the memo paper main portion can be detached.

Positioning symbols (M1 to M4) are printed on the surface of the memo paper main portion in areas near the four corners. Out of the four positioning symbols, the positioning symbols at the upper left (M1), lower left (M2) and lower right (M3) correspond to a symbol code constituted by a multi-valued graphic according to the present invention, and is a square (emerging portion) which is filled and is enclosed by a ground color portion (non-emerging portion) of the white paper, is disposed inside a square bold line form (emerging portion). This bold line form is preferably printed with a line thicker than general writing instruments (pencils, ball point pens, felt tip pens) so as to be clearly distinguishable from handwriting written with writing instruments in the later mentioned first range. The positioning symbol may be a color code.

An orientation symbol (M4), of which shape is different from the above mentioned positioning symbol, is printed at the upper right of the paper main portion. The orientation symbol (M4) corresponds to a symbol code constituted by the multi-valued graphic according to the present invention, and has a shape that is different from positioning symbols at the upper left (M1), lower left (M2) and lower right (M3). By making the shape of only one of the four symbols to be different from the others, the correct direction of the memo paper (DOC) can be detected when imaged by a camera (CAM).

The area surrounded by the four positioning symbols (M1 to M4) is a first area (AR1), where the user can draw handwritten characters, graphics, symbols and pictures. The image in the first range (AR1) is written as original image data.

Figure 3:
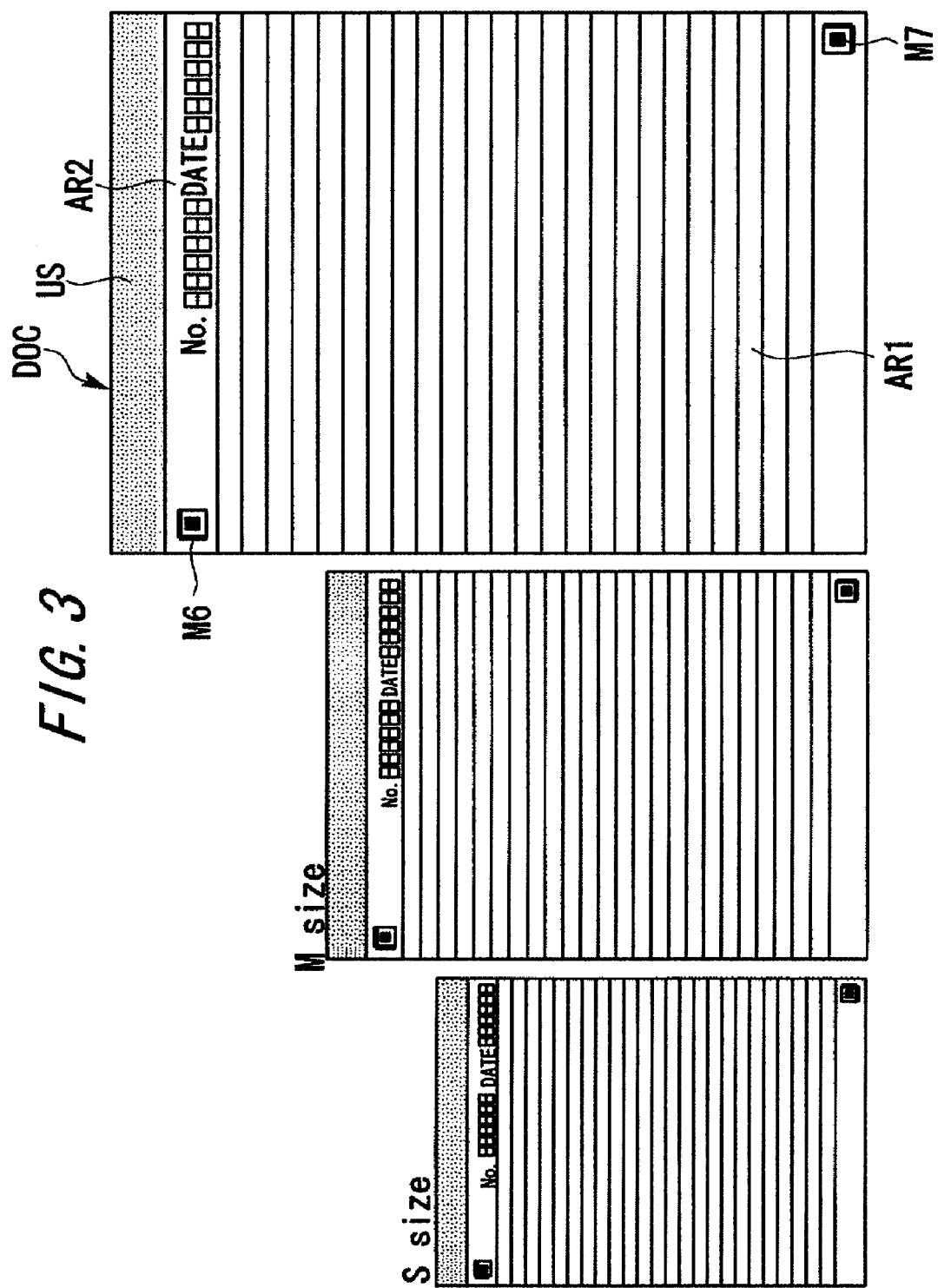
FIG. 3 is a diagram depicting a memo paper serving as an imaging object according to an embodiment, (3)

In this example, the first range (AR1) is recognized as a portion surrounded by the four positioning symbols (M1 to M4), but the number of positioning symbols which are disposed need not be four, but may be two, only at the upper left (M6) and the lower right (M7), as shown in FIG. 3. In other words, a rectangular area of which diagonal line is a line connected the upper left positioning marker (M6) and the lower right positioning marker (M7) may be recognized as the first range (AR1).

Figure 2:
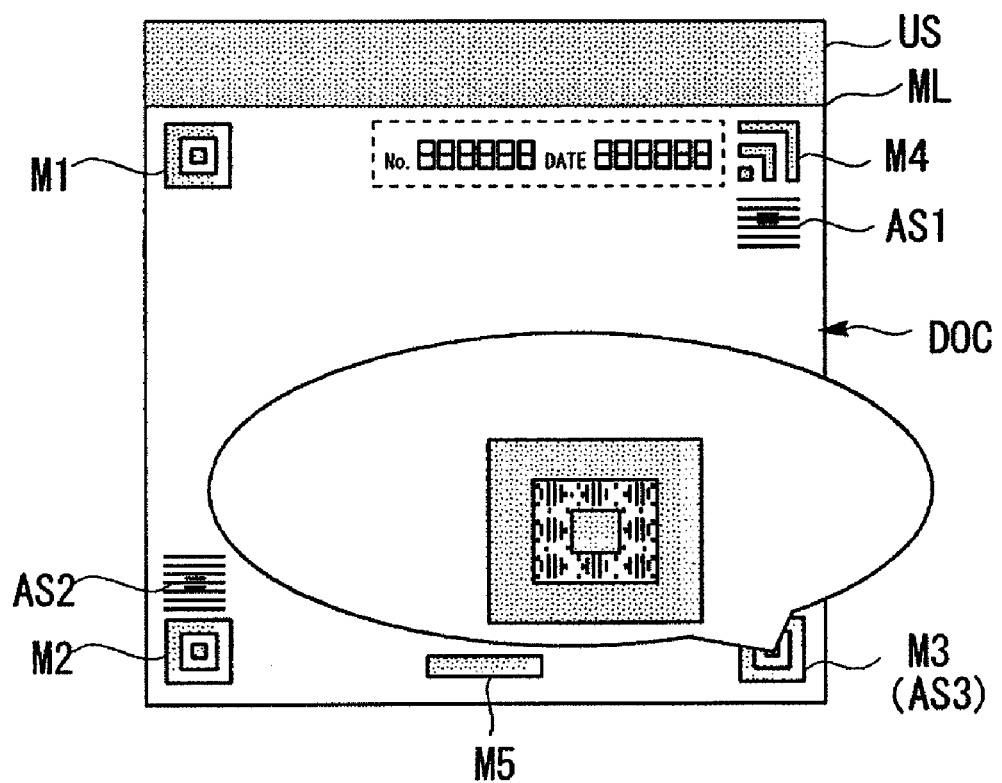
FIG. 2 is a diagram depicting a memo paper serving as an imaging object according to an embodiment, (2)

In the above description, the shape of the upper right symbol, out of the four positioning symbols (M1 to M4), is changed to be the orientation symbol, but the orientation symbol may be printed in a location other than the positioning symbols (M1 to M4), as shown by M5 in FIG. 1 and FIG. 2.

A second range (AR2) may be recognized based on the relative positional relationship between the positioning symbol (M1) and the positioning symbol (M2). The second range (AR2) may be recognized based on the relative positional relationship between the positioning symbols and the orientation symbol, instead of the relative positional relationship between positioning symbols. In the case of the example shown in FIG. 3, the second range (AR2) may be recognized based on the binding margin (US).

In FIG. 1, the second range (AR2) is disposed at the left area near the orientation symbol (M4) in the first range (AR1). The second range (AR2) has a height the same as the height of the orientation symbol, and since the left side edge of the orientation symbol (M4) matches with the right side edge of the second range, the second range can be detected if the orientation symbol (M4) is detected based on the original image data imaged by the camera (CAM).

In the second range, an entry guide, which is a straight line piece constituting seven segments, is printed with a light color, as shown in FIG. 3, although FIG. 1 does not illustrate details. In other words, by tracing the entry guide portion constituting the seven segments using a writing instrument, a numeric character from 0 to 9 can be written in each segment, just like the numeric display of an electric scoreboard.

By creating the seven segments of the entry guide, the recognition rate of the entered numeric characters can be increased. The above is an example of disposing seven segments of the entry guide to make it easier to recognize entered numeric characters, but the present invention is not limited to this, and a frame may be printed with a light color for each character so as to recognize a numeric character or alphabetic character written in this frame. In other words, by reading the characters (alphanumeric) entered in the second range (AR2) with a camera (CAM), and comparing the characters with character patterns (character information for collation) stored in memory (MEM), character recognition can be performed.

As FIG. 2 shows, a prohibition symbol (AS1) is disposed immediately below the orientation symbol (M4) on the memo paper (DOC). This prohibition symbol is printed in a way visually unrecognizable, by ground tint printing for example, and appears as a visible prohibition symbol when the memo paper is electronically copied using a copy machine or the like. The prohibition symbol is located in a predetermined position in the first range (AR1), and can be located in a position immediately above the lower left positioning symbol (M2), as shown in FIG. 2, for example.

The ground tint printing emerging (visualized) may be actively recognized as a prohibition symbol by a program. When the presence of the prohibition symbol on the memo paper (DOC) is recognized, the central processing unit (CPU) may stop image processing according to a program, and such a message as "This paper is not standard paper" may be displayed on a display (DISP).

Figure 4:
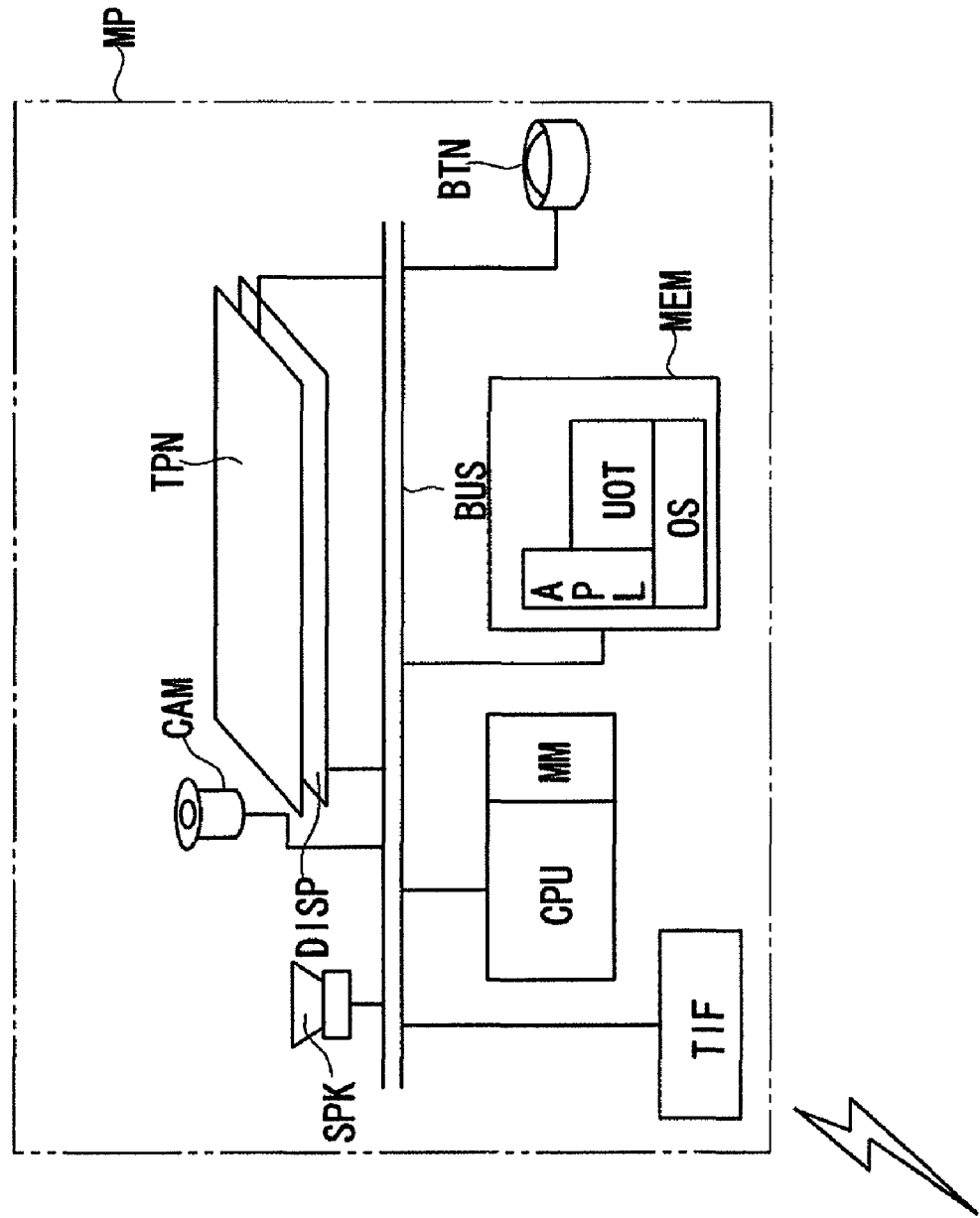
FIG. 4 is a diagram depicting a configuration of a smart phone with a camera used for the embodiment.

Now a hardware configuration of a smartphone with a camera (MP) used for the present embodiment will be described with reference to FIG. 4. This smartphone (MP) is an iPhone® of Apple Inc. (registered trademark used based on Aiphone Co. Ltd. licensing), for example.

The main body of the smartphone has a home button (BTN), which functions to return icons and menus displayed on the display (DISP) to a home screen, or functions as a shutter of a camera (CAM).

The smartphone (MP) encloses a central processing unit (CPU) along with a main memory (MM), a memory unit (MEM) connected via a bus (BUS), a communication interface (TIF), the camera (CAM), the button (BTN), a touch panel display where a touch panel (TPN) and a display (DISP) are integrated, and a speaker (SPK).

Figure 5:
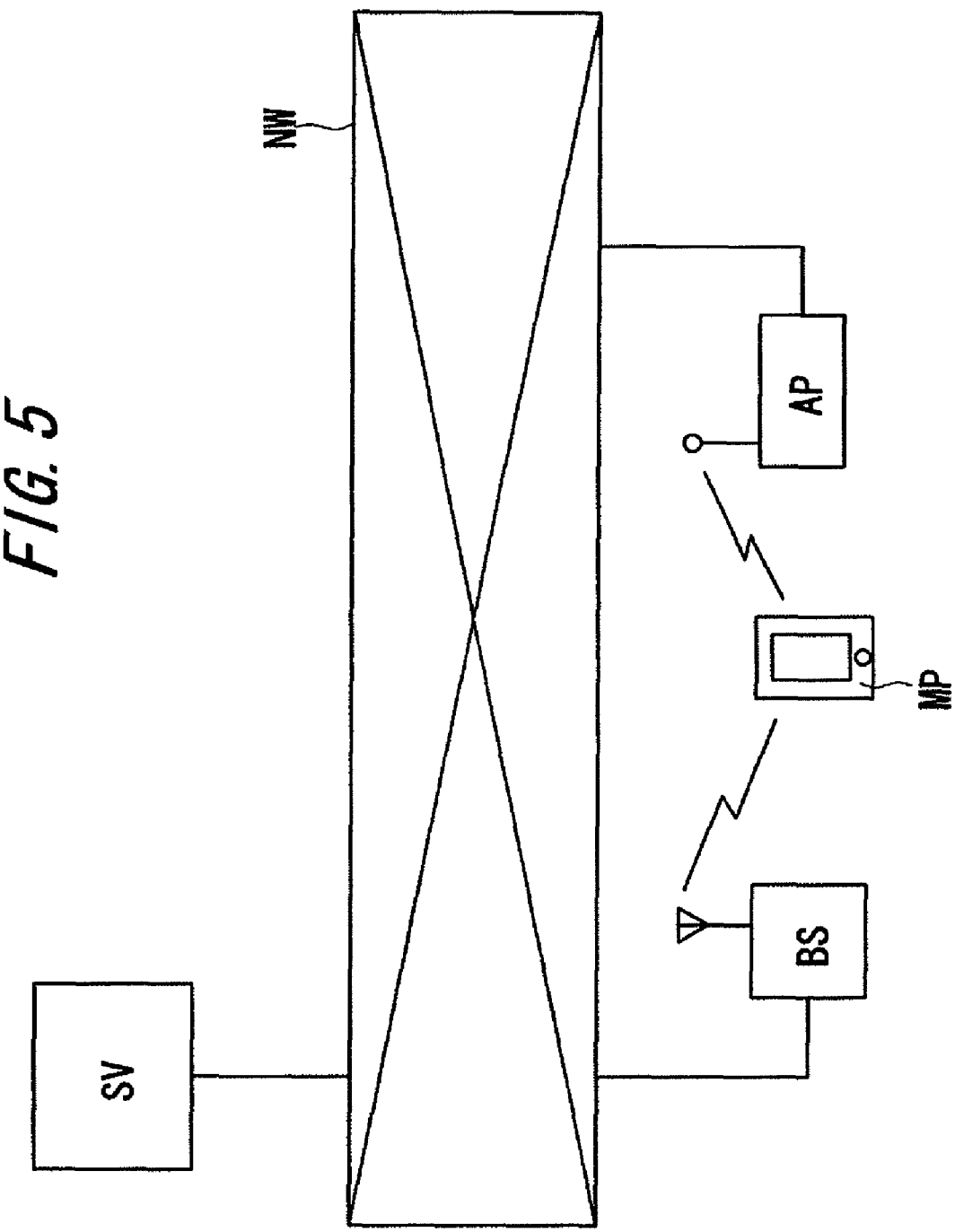
FIG. 5 is a diagram depicting a case of using the embodiment in a network.

As FIG. 5 shows, the communication interface (TIF) can be connected to a standard network (NW) via a base station (BS) through a wireless telephone connection. This communication interface (TIF) can communicate with an access point (AP) of a wireless LAN, and can be connected to a network via any communication means.

In the memory unit (MEM), an image processing application program (APL), and a user data area (UDT) for holding the original image data and character information, are disposed along with the operating system (OS).

According to the present embodiment, capturing an image of the memo paper (DOC) and image processing thereof are implemented by the central processing unit (CPU) reading an image processing application program (APL) of the memory unit (MEM) via the bus (BUS) and the main memory (MM), and sequentially executing the program. This processing will now be described based on the processing flow in FIG. 6.

When the image processing application program (APL) is selected and started up by a user touching the touch panel (TPN) (step 601), the camera (CAM) function is activated, a memo paper (DOC), which is an imaging object, is photographed, and the central processing unit (CPU) reads this captured image based on the program, and determines whether the prohibition symbol described in FIG. 2 is present (step 603). The presence of a prohibition symbol is determined by reading the image data of the prohibition symbol to be the reference, which is recorded in the memory unit, and comparing this image with the original image data from the camera (CAM).

If the prohibition symbol is detected here, processing returns to step 602, without executing subsequent steps. In this case, such a message as "This paper is not standard paper" may be displayed on the display (DISP), as mentioned above, in order to notify the detection of the prohibition symbol to the user.

If the prohibition symbol is not detected, the central processing unit (CPU) searches the positioning symbols in the original image data (step 604). This search of the positioning symbols is also executed by reading the image data of the positioning symbols to be a reference, which is recorded in the memory unit, and comparing the image data with the original image data from the camera (CAM).

If the positioning symbols are detected, the original image data is saved in the memory unit (MEM) at this stage (step 605). A shutter sound may be output from the speaker (SPK) in order to notify the decision to use the original image data at this time. Even if the positioning symbols are not recognized in step 604, a shutter sound may be generated by the user operating the button (BTN) (step 611) to save the original image data at this point in the memory unit (MEM), and continue searching the positioning symbols (step 612). In this case as well, if the positioning symbols cannot be detected for a predetermined time, the user may be allowed to select to either hold the original image data as is, or return to step 602 and photograph the memo paper again (step 613).

If the original image data is held in step 605, the number of positioning symbols is counted (step 606). If only three positioning symbols have been detected, the remaining one positioning symbol is estimated based on the three positions, and the fourth positioning symbol (dummy) is additionally set (step 610).

When all four positioning symbols (M1 to M4) are determined, the four virtual lines connecting the edges of the four positioning symbols are set, and the portion enclosed by the virtual lines in the image is extracted as a first range (step 607).

Then keystone correction is performed on the extracted image so that the positions and distances of the four sides match with the reference positions and distances stored in the memory unit in advance (step 608), and the corrected image is saved in the memory unit (MEM) as the reproduced image of the memo paper (DOC) (step 609).

Figure 6:
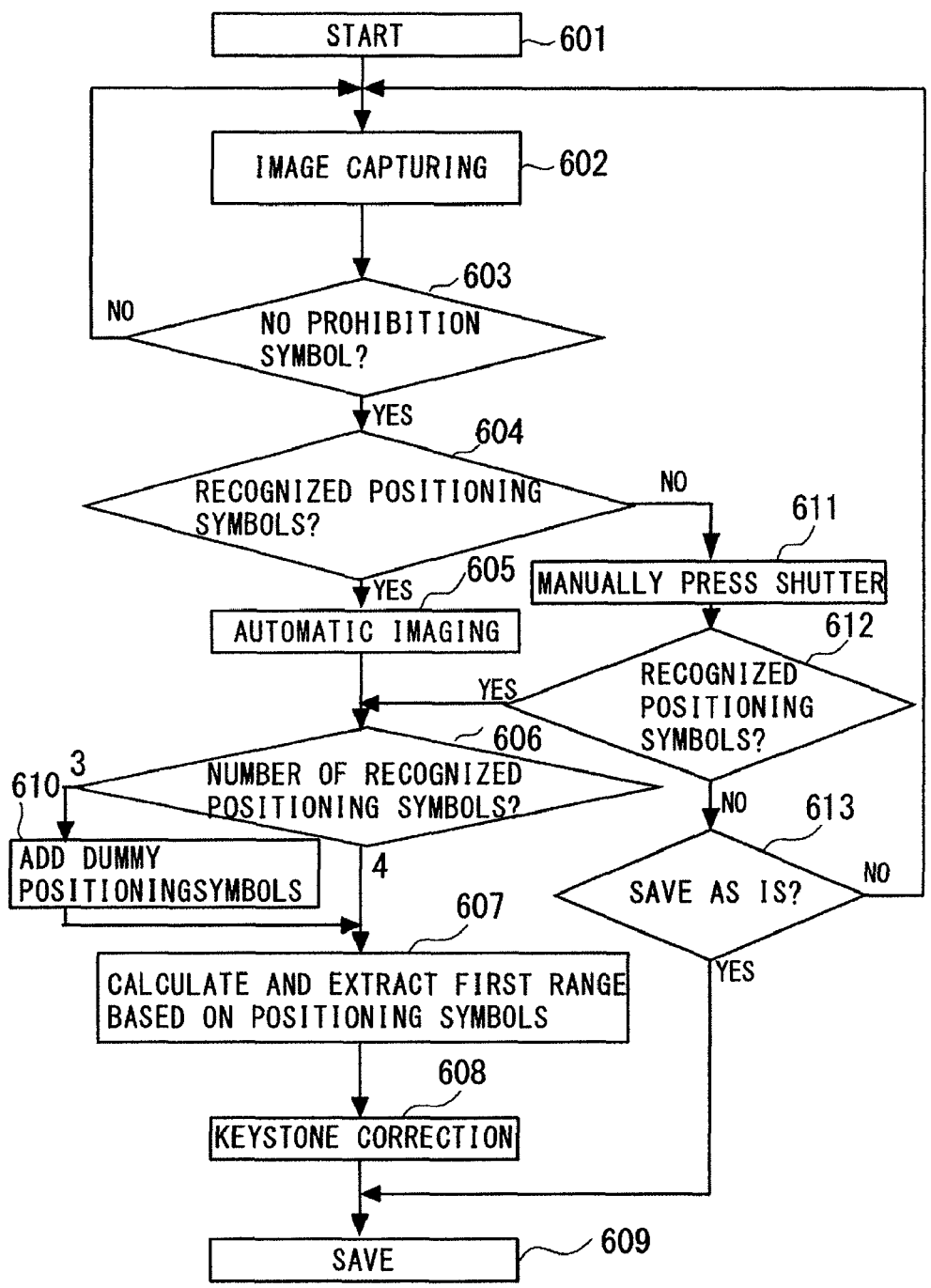
FIG. 6 is a flow chart depicting an example of the processing according to the embodiment.
Figure 7:
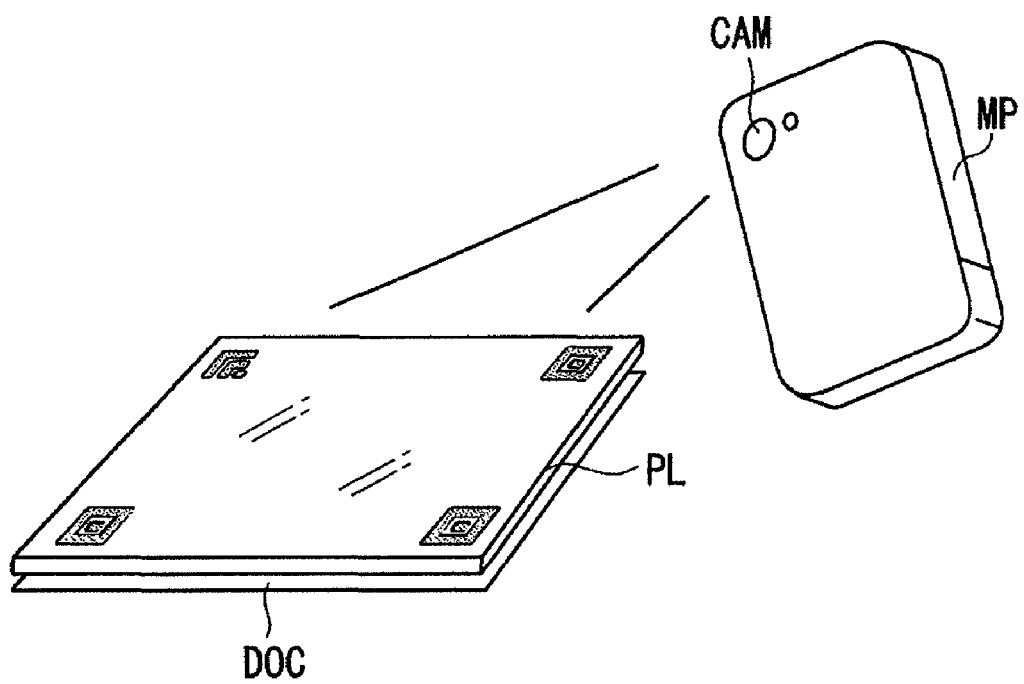
FIG. 7 is a diagram depicting a photographing state and a transparent plate on which positioning marks are printed according to the embodiment.
Figure 8:
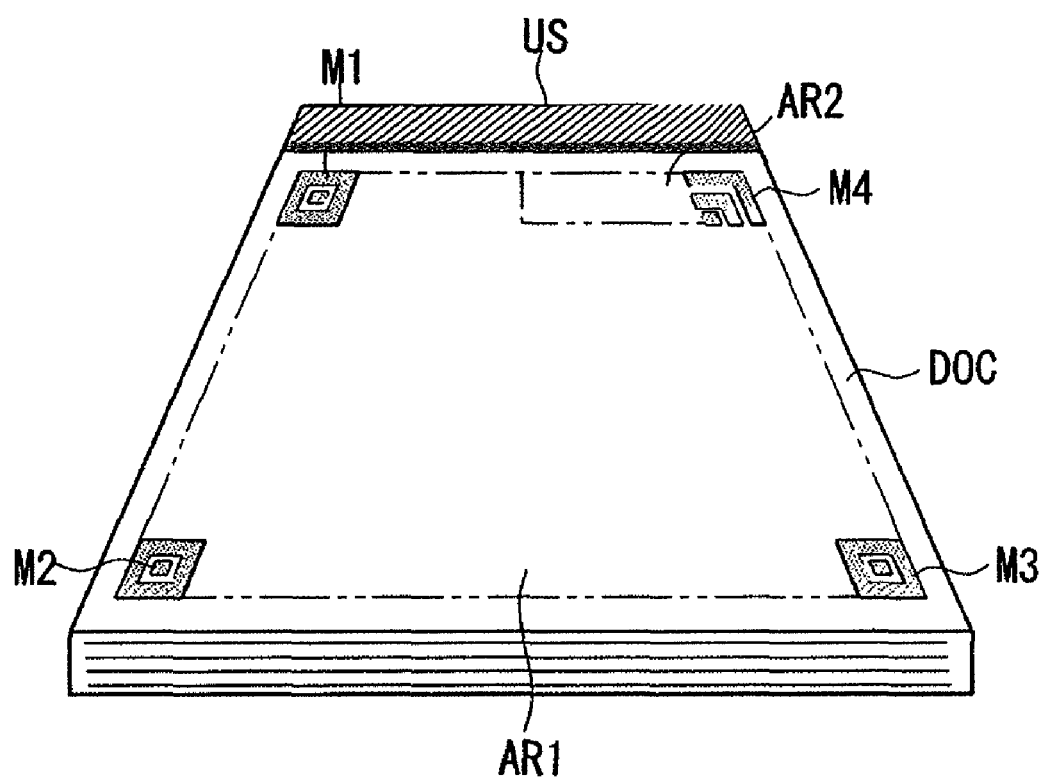
FIG. 8 is a diagram depicting a memo paper serving as an imaging object according to an embodiment, (4)

In FIG. 6, processing in the case of the prohibition symbol (AS1) being disposed immediately below the orientation symbol (M4) of the memo paper (DOC) or immediately above the lower left positioning symbol (M2) was described. The prohibition symbol, however, may be disposed in a non-emerging portion (white background portion) of a positioning symbol (e.g. M3) by ground tint printing, as shown in FIG. 2. The prohibition symbol may be disposed in a non-emerging portion (white background portion) of another positioning symbol (e.g. M3) by ground tint printing. If the positioning symbol (M3) and prohibition symbol (AS3) are superimposed and printed like this, and if the memo paper (DOC) is electronically copied by a copy machine, the positioning symbol (M3) of the copy has a different shape from the other positioning symbols, hence the central processing unit (CPU) performs processing to not recognize this positioning symbol as the positioning symbol (M3) by a program when the image processing is performed after the image is read by the camera (CAM). After this, the processing of the original image data in the first range may not be executed.

Figure 10:
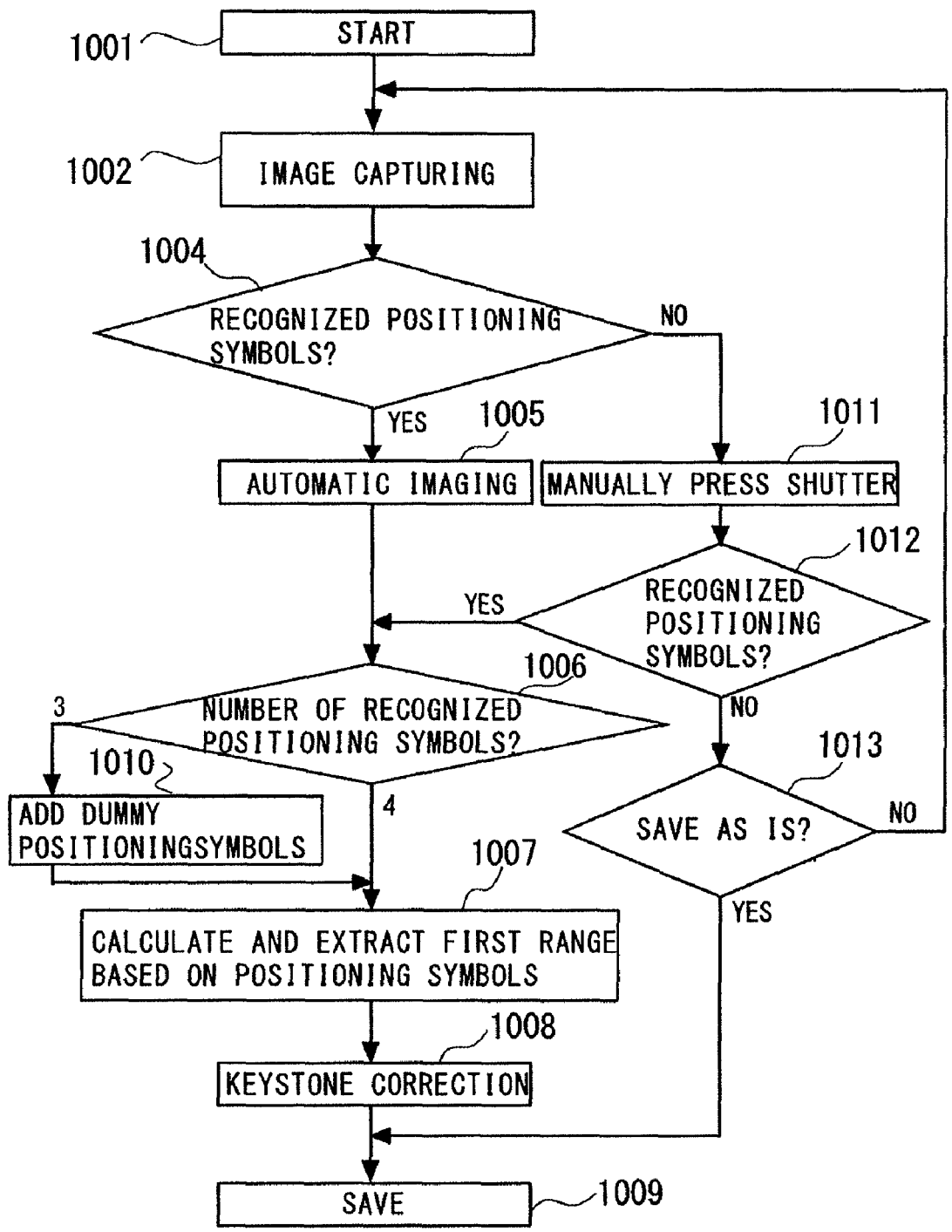
FIG. 10 is a flow chart depicting another example of processing according to the embodiment.

If the prohibition symbol is disposed in the non-emerging portion (white background portion) of the positioning symbol by ground tint printing, it is not necessary to recognize the prohibition symbol. Therefore the imaging and image processing can be performed based on the processing flow shown in FIG. 10. A difference of the processing shown in FIG. 10 from the processing flow in FIG. 6 is that processing to search the positioning symbols (step 1004) is executed without executing the processing for determining the presence of the prohibition symbol (step 603) in FIG. 6. The last two digits of the reference numeral in each step in FIG. 10 correspond to the last two digits of each step in FIG. 6, and it is assumed that the same processing is performed in steps of which last two digits of the reference numeral are the same.

In the above mentioned processing flow, an example of executing the keystone correction using all four positioning symbols was described, but the present invention is not limited to this, and as described in FIG. 3, the keystone correction may be executed using only the upper left positioning symbol (M6) and the lower right positioning symbol (M7) as references. In this case, only two positioning symbols are detected in step 606. For the remaining two positioning symbols, dummy positioning symbols may be set by estimating the positions thereof.

In the above description, the case of executing every processing using a smartphone (MP) was described, but a server (SV) connected via the network (NW) may execute a part of the processing.

For example, after the memo paper (DOC) is photographed by the camera (CAM), the original image data is saved in the memory unit (MEM) once, then is transmitted to the server (SV) via the communication interface (TIF) and the network (NW).

The server (SV) which received the original image data detects the positioning symbols in the original image data based on the image processing program stored in the server, recognizes a predetermined area calculated based on the positioning symbols as the first range, extracts only the image data existing in the first range, and stores the image data in the server (SV) as the extracted image data.

The image data stored in the server (SV) may be accessed from the smartphone (MP) via the network (NW).

In the above description, the example of directly printing the positioning symbols and orientation symbol on the memo paper (DOC) was described, but the present invention is not limited to this, and the positioning symbols and orientation symbol may be printed on a transparent plastic sheet (PL), or seals, on which the positioning symbols and orientation symbol are printed, may be pasted thereon, so that the plastic sheet (PL) is placed on the memo paper (DOC) and the surface of the memo paper (DOC) is photographed in this state by the camera (CAM) through the plastic sheet.

Figure 9:
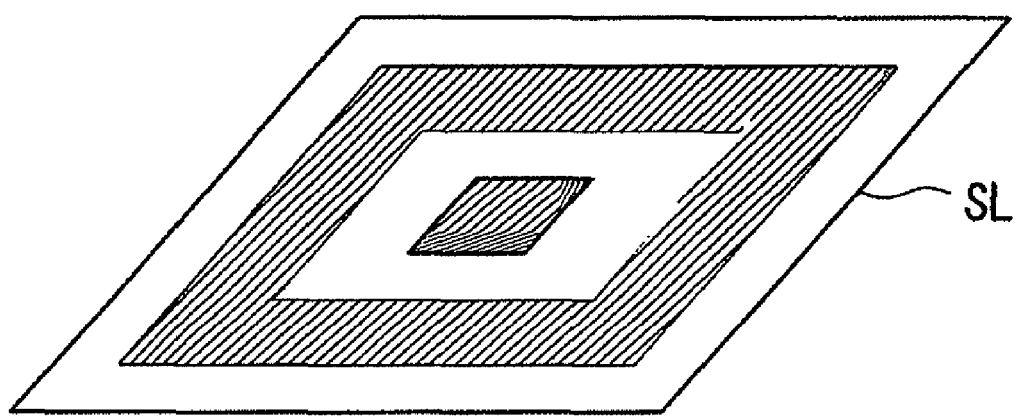
FIG. 9 is a diagram depicting a seal on which a positioning mark is printed used for the embodiment.

Seals (SL) created as plastic films on which the positioning symbols and orientation symbol are printed, as shown in FIG. 9, having the adhesive surfaces created on the rear face of a seal (SL) may be provided so as to be pasted on a standard memo paper and report paper.

In the above description, the imaging object was described as the memo paper (DOC), but any paper size can be used as long as the positioning symbols and orientation symbol can be set, such as a A4 size report paper, white paper, a printed document, a business card or a business card sized memo paper.

The present invention can be used for the image processing field where documents are photographed without contact using a camera.

What is claimed is:

1. An imaging object used for an image processing system which includes: imaging unit which images an imaging object having positioning symbols; image acquisition unit which detects the positioning symbols from original image data imaged by the imaging unit, recognizes a predetermined area calculated based on the positioning symbols as a first range, extracts only image data existing in the first range to acquire this image data as extracted image data, and corrects the extracted image data based on a distance between the positioning symbols; and image data storage unit which stores the extracted image data acquired by the image acquisition unit, the imaging object comprising:

a rectangular paper main portion; and the positioning symbols which are formed in at least two kinds of shapes and disposed in at least two locations out of areas near four corners of the paper main portion, and are created as symbol codes constituted by multi-valued graphics, wherein each of the positioning symbols has an emerging portion having a color value that is different from a ground color of the paper main portion and a non-emerging portion having the ground color of the paper main portion, the emerging portion of a first positioning symbol includes a frame-shaped emerging portion having two straight line portions respectively parallel with two sides extending from a corner of the paper main portion and a corner portion where edges of the two straight line portions contact each other, and the non-emerging portion of the first positioning symbol is an area having the ground color which is surrounded by the frame-shaped emerging portion, and the emerging portion of a second positioning symbol at least includes an emerging portion having two straight line portions respectively parallel with two sides extending from a corner of the paper main portion and a corner portion where edges of the two straight line portions contact each other, and a rectangular emerging portion which is located inside the emerging portion having the two straight line portions and the corner portion, and the non-emerging portion of the second positioning symbol is an area between the emerging portion having the two straight line portions and the corner portion and the rectangular emerging portion.

2. The imaging object according to claim 1, wherein the positioning symbols are disposed in areas near the four corners of the paper main portion respectively, and one of the four positioning symbols is an orientation symbol of which shape is different from those of the other three positioning symbols.

3. The imaging object according to claim 2, further comprising a second range, which is disposed within the first range or disposed as a separate area from the first range, and of which direction is recognized by a positional relationship with the orientation symbol, and which is constituted by a range where characters for collating with character information for collation stored in the image data storage unit in advance are written.

4. The imaging object according to claim 1, wherein
the positioning symbols are disposed so that the distance between the positioning symbols matches with a reference distance between the positioning symbols which is stored in the image acquisition unit in advance, and
the imaging object further comprises a first range delimited by the positioning symbols.

5. The imaging object according to claim 1, wherein
the paper main portion further includes a second range constituted by seven segments of an entry guide.

6. The imaging object according to claim 1, wherein
the paper main portion is subjected to printing processing so that, when the paper main portion is electronically copied, a prohibition symbol emerges at a predetermined location having a shape different from those at other locations.

7. The imaging object according to claim 1, wherein
the non-emerging portion has a background portion and a latent image portion having different patterns which are not visualized by the imaging unit, but visibly emerge by electronic copying.

8. The imaging object according to claim 1, having a background portion and a latent image portion having different patterns which are not visualized by the imaging unit, but visibly emerge by electronic copying, in a predetermined area excluding an area where the positioning symbols are formed.

9. An imaging object used for an image processing method which includes the steps of: imaging an imaging object having positioning symbols; detecting the positioning symbols from imaged original data; recognizing a predetermined area calculated based on the detected positioning symbols as a first range, extracting only image data existing in the recognized first range to acquire this image data as extracted image data; correcting the extracted image data based on a distance between the positioning symbols; and storing the extracted image data, the imaging object comprising:

a rectangular paper main portion; and the positioning symbols which are formed in at least two kinds of shapes and disposed in at least two locations out of areas near four corners of the paper main portion, and are created as symbol codes constituted by multi-valued graphics, wherein each of the positioning symbols has an emerging portion having a color value that is different from a ground color of the paper main portion and a non-emerging portion having the ground color of the paper main portion, the emerging portion of a first positioning symbol includes a frame-shaped emerging portion having two straight line portions respectively parallel with two sides extending from a corner of the paper main portion and a corner portion where edges of the two straight line portions contact each other, and the non-emerging portion of the first positioning symbol is an area having the ground color which is surrounded by the frame-shaped emerging portion, and the emerging portion of a second positioning symbol at least includes an emerging portion having two straight line portions respectively parallel with two sides extending from a corner of the paper main portion and a corner portion where edges of the two straight line portions contact each other, and a rectangular emerging portion which is located inside the emerging portion having the two straight line portions and the corner portion, and the non-emerging portion of the second positioning symbol is an area between the emerging portion having the two straight line portions and the corner portion and the rectangular emerging portion.

* * * * *